United States Patent [19]

Simon

[11] Patent Number: 4,989,438

[45] Date of Patent: Feb. 5, 1991

[54] POWER ACTUATED DEVICE FOR INSTALLING METAL CORNER STRIP

[75] Inventor: Rodolphe J. Simon, Manchester, Conn.

[73] Assignee: Nastasi-White, Inc., Flushing, N.Y.

[21] Appl. No.: 423,950

[22] Filed: Oct. 19, 1989

Related U.S. Application Data

[63] Continuation-in-part of Ser. No. 157,377, Feb. 18, 1988, abandoned.

[51] Int. Cl.[5] .......... B23P 11/00

[52] U.S. Cl. .......... 72/325; 29/243.5; 227/119; 227/130; 227/131; 227/140

[58] Field of Search .......... 72/325, 407, 430, 451, 72/434; 29/243.5, 243.56, 243.57; 227/119, 130, 131, 108, 148, 140, 152

[56] References Cited

U.S. PATENT DOCUMENTS

| | | | |
|---|---|---|---|
| 969,471 | 9/1910 | Grossman . | |
| 2,267,206 | 12/1941 | Lopes . | |
| 2,859,445 | 11/1958 | Larrabee . | |
| 2,944,262 | 7/1960 | Richman . | |
| 3,023,417 | 3/1962 | Michel | 227/108 |
| 3,029,436 | 4/1962 | Kufel | 227/108 |
| 3,160,890 | 12/1964 | Lefebvre . | |
| 3,526,944 | 9/1970 | Cherup | 29/243.57 |
| 3,670,941 | 6/1972 | Grinnell | 227/119 |
| 3,810,495 | 5/1974 | Pack | 29/243.56 |
| 4,288,016 | 9/1981 | Failla | 227/30 |
| 4,558,584 | 12/1985 | Myers | 72/407 |
| 4,670,957 | 6/1987 | Wolford | 29/243.5 |
| 4,700,876 | 10/1987 | Wingert | 227/131 |

*Primary Examiner*—Daniel C. Crane

*Attorney, Agent, or Firm*—Kramer, Brufsky & Cifelli

[57] ABSTRACT

A power actuated device for attaching a protective metal strip to the outside corner formed by two intersecting wall panels is provided. The device includes a shoe releasably mounted on the device for holding the device and the protective in alignment along the corner. The shoe is provided in a number of differing shapes, each one of which complements the contour of an associated protective strip. The device further includes attaching means supported on the shoe for attaching the metal strip to the wall, a toggle mechanism for moving the attaching means between an inactive and an attaching position and an electrically powered actuator supported on the shoe and connected to the toggle mechanism to move the attaching means between their inactive and attaching positions.

13 Claims, 5 Drawing Sheets

POWER ACTUATED DEVICE FOR INSTALLING METAL CORNER STRIP

This is a continuation-in-part of co-pending application Ser. No. 157,377 filed on Feb. 18, 1988, now abandoned.

BACKGROUND OF THE INVENTION

This invention relates to a device for installing a protective corner strip along a corner formed by two intersecting wall panels of, for example, sheetrock or gypsum board. More specifically, this invention relates to a hand held power actuated device usable for attaching a protective corner strip to wall corners of differing contour.

The outside corners of sheetrock or gypsum board walls are customarily finished by attaching a metal strip having a shape which complements the contour of such corners. After the strip is attached to the wall it is covered with joint compound which, after hardening, substantially conceals the protective strip.

The metal strip is sometimes attached to the wall by nailing, however, it is more often attached by forming several indentations or crimps in the side portions of the strip which project into the wall material. Heretofore, the indentations and corresponding projections have been formed using a tool which, when struck with a hammer, simultaneously drives a pair of chisel shaped crimping elements into the opposite sides of the metal strip. The tool is manufactured by the Goldblat Tool Company, Cincinnati, Ohio.

To operate such a tool, a workman must simultaneously manipulate the metal strip, the crimping tool and a hand-held hammer. That is, the workman must with one hand hold the strip in alignment with the corner of the wall and, with the same hand, hold the crimping tool in alignment with the metal strip. When the strip is in alignment with the wall and the tool is aligned with the strip, the workman uses his free hand to strike the tool with the hammer to simultaneously drive the crimping elements into either side of the strip thus attaching the strip to the wall. The workman must be careful to avoid damaging the wall and must strike the crimping tool squarely to avoid breaking metal particles off of the tool which might cause injury. In fact, a warning label attached to the tool expressly cautions of the danger posed by such particles.

In addition to the problems just noted, the Goldblat device is useful only for attaching a protective strip having a shape which complements a right angle-outside wall corner. This presents a serious disadvantage since outside wall corners are commonly formed at angles other than 90° or with rounded contours. Heretofore, a time consuming manual procedure was the only method available for attaching protective strips to such corners.

It is a general aim of the present invention to provide an improved tool which overcomes the aforesaid problems.

It is a more specific aim of the present invention to provide a power actuated tool usable for attaching a protective strip to wall corners of differing contour.

SUMMARY OF THE INVENTION

The present invention provides a power actuated device for attaching a protective strip to the corner formed by the intersection of two wall panels. Such protective strips are provided in a number of differing shapes, each one of which complements the contour of the corner to which it is attached. The device comprises a shoe releasably mounted on the device for holding the protective strip and the devise in alignment along the corner. The shoe is provided in a number of differing shapes, each one of which has a contour substantially complementing the contour of an associated protective strip. Since the shoe is releasably mounted on the device, a shoe having the desired contour is selected from a number of interchangeable shoes of differing shape and mounted on the device to complement the contour of the particular strip being attached.

The device further comprises means for releasably mounting the shoe on the device and attaching means supported on the shoe for movement between an inactive position wherein the attaching means are out of engagement with the protective strip held by the shoe and an attaching position wherein the attaching means engage and attach the protective strip into holding engagement with the wall panels. Operating means for moving the attaching means from the inactive to the attaching position, biasing means for normally maintaining the attaching means in the inactive position, and power operated means mounted on the shoe and operably connected to the operating means for activating the operating means to move the attaching means to the attaching position are also provided.

The nature of the invention and its novel features and their advantages will be better understood from the following detailed description and accompanying drawings.

DETAILED DESCRIPTION OF THE INVENTION

Figure 1:
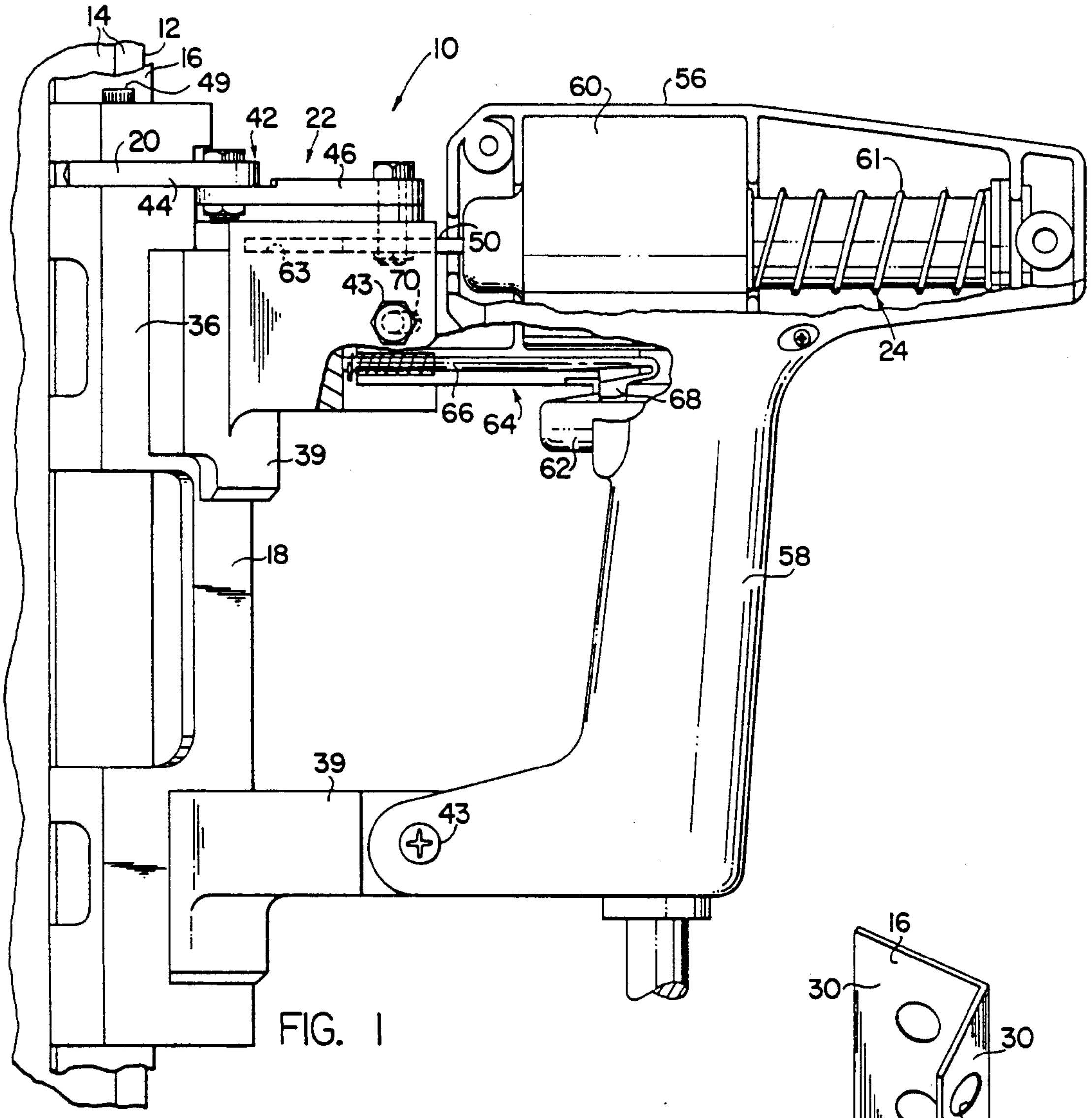
FIG. 1 is a fragmentary side elevational view of a power actuated attaching device shown in alignment along the outside corner of a wall and in engagement with a protective corner strip to be attached to the wall.

FIG. 1 illustrates a power actuated device embodying the present invention. The device 10 essentially comprises an elongated shoe, indicated generally at 18, for holding a protective strip, for example the strip 16, in place along an associated corner such as the corner 12, a pair of crimping elements 20, 20 pivotally and releasably supported on the shoe 18 (best shown in FIGS. 5 and 6), a toggle mechanism indicated generally at 22 for moving the crimping elements into crimping engagement with the protective strip, and an electrically powered actuator, indicated generally at 24, mounted on the shoe 18 for operating the toggle mechanism 22.

Figure 3:
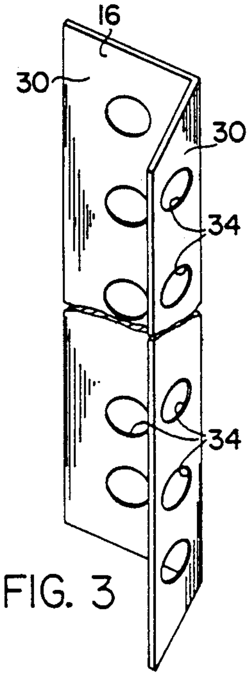
FIG. 3 is a perspective view of a typical protective corner strip.

As noted previously, the protective strips used to protect the outside corners formed by intersecting sheetrock or gypsum board wall panels are provided in a number of different shapes, each one of which generally complements the contour of an associated corner. FIG. 3 illustrates a protective corner strip adapted to complement the contour of a right angle-outside wall corner. The strip 16 is customarily made from sheet metal and comprises an angle member having two normally disposed and intersecting sides 30, 30. The sides 30, 30 are adapted to overlie the edges of the wall panels when the strip is positioned on the corner 12 formed by the intersecting panels. After the strip is attached to the wall with the device 10, the corner is finished using a suitable joint compound which, after hardening, conceals the strip. To ensure a firm bond between the metal strip and the joint compound, strip 16 includes a number of holes 34, 34 which are penetrated by the joint compound.

Figure 4:
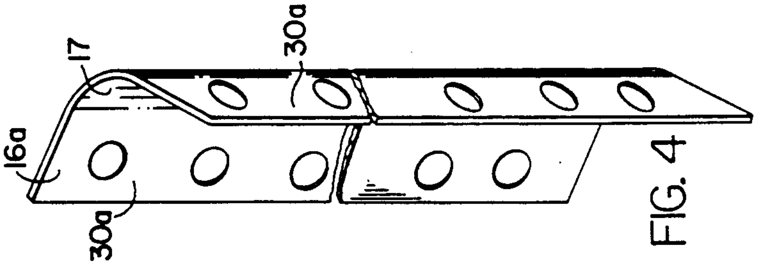
FIG. 4 is a perspective view of a second protective corner strip.
Figure 7:
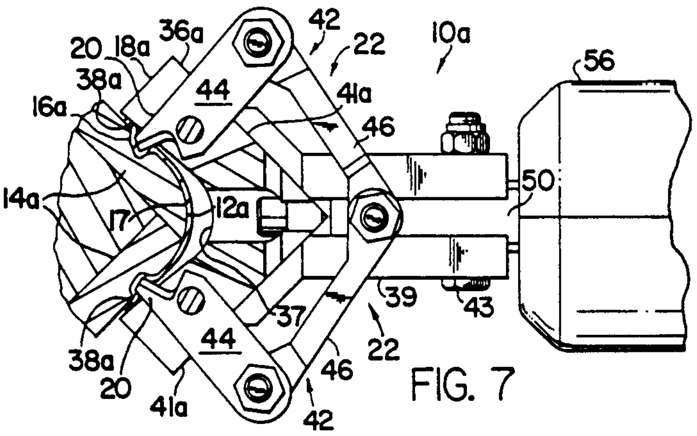
FIG. 7 is a fragmentary top plan view partially in section showing the protective strip of FIG. 4 received within the shoe and the crimping elements in crimping position.

FIG. 4 illustrates a second protective strip **16*a* having a shape which complements an arcuate or rounded outside wall corner, such as the corner 12*a* formed by the wall panels 14*a*, 14*a* shown in cross-section in FIG. 7. As in the case of protective corner strip 16, the strip 16*a* is customarily made from sheet metal. The strip 16*a* comprises an elongated central channel 17 having an arcuate shape in cross-section and two angularly disposed tabs 30*a*, 30*a* extending along the lateral edges of the channel 17. The tabs are adapted to overlie the edges of the intersecting wall panels which form the corner. Again, once the strip 16*a*** is attached to the corner it is covered with a suitable joint compound.

Figure 2:
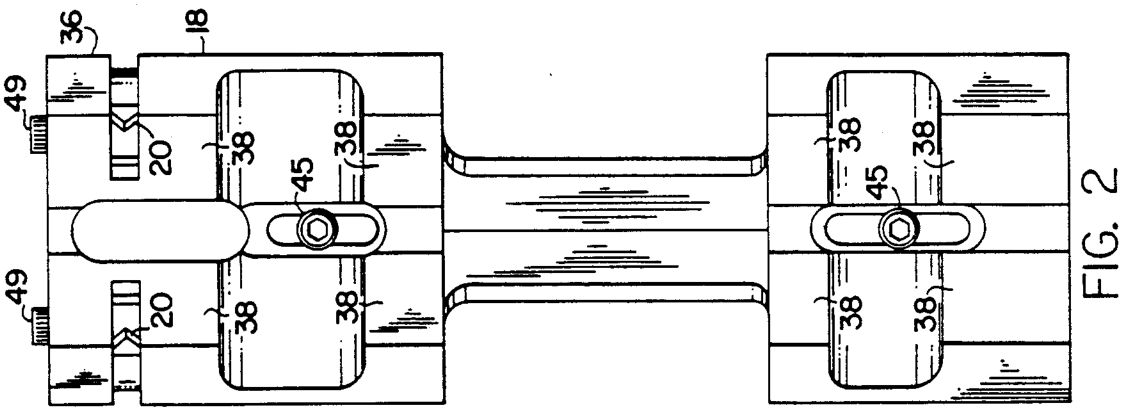
FIG. 2 is an end view of the elongated shoe which forms part of the attaching device of FIG. 1.

Referring now to FIGS. 1 and 2, the elongated shoe 18 is constructed to engage and complement the protective strip 16 and hold the strip and the attaching device 10 in alignment with the corner 12 during the attaching procedure. The shoe 18 is preferably made from lightweight rigid material such as aluminum or plastic and comprises an angle member 36 defining angularly disposed abutment surfaces 38, 38. The shoe is constructed so that abutment surfaces 38, 38 engage and substantially complement the sides 30, 30 of strip 16 when the strip is held in place along the corner 12. In its most preferred embodiment, the shoe 18 is constructed so that abutment surfaces 38, 38 are disposed at an angle slightly less than 90° to insure that sides 30, 30 of strip 16 are firmly pressed against the wall panels during the attaching procedure. The abutment surfaces 38, 38 permit the elongated shoe to maintain the strip 16 and device 10 in alignment with corner 12 during the attaching procedure.

As noted previously, the device 10 is provided with a number of interchangeable shoes of differing shape, each one of which has a contour complementing the contour of at least an associated portion of a selected protective strip. For example, FIG. 7 illustrates in cross section a shoe **18*a* adapted to engage and complement the protective strip 16*a*. The shoe 18*a* comprises an angle member 36*a* defining an elongated central trough 37 having an arcuate shape in cross-section and two angularly disposed abutment surfaces 38*a*, 38*a* extending along the lateral edges of the trough 37. The shoe 18*a* is constructed so that the trough 37 engages and substantially complements the central channel 17 of the protective strip 16*a*, and the abutment surfaces 38*a*, 38*a* engage and complement the tabs 30*a*, 30*a* when the strip 16*a* is held in place along the corner 12*a***.

Figure 5:
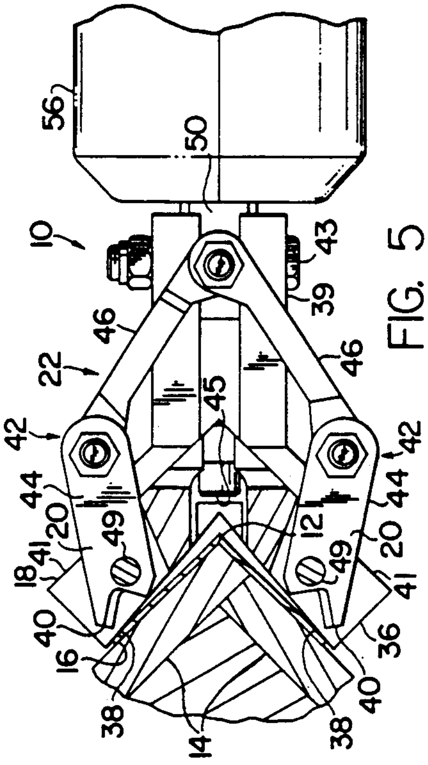
FIG. 5 is a fragmentary top plan view partially in section showing the protective strip of FIG. 3 received within the shoe and the crimping elements of the attaching device in inactive position.
Figure 6:
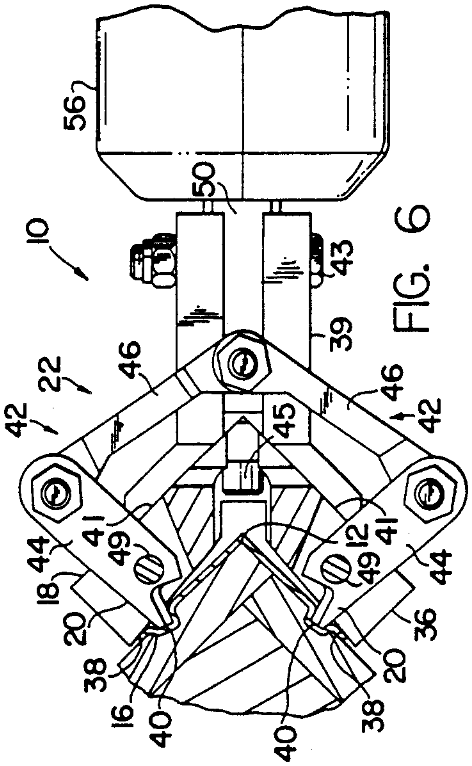
FIG. 6 is a fragmentary top plan view partially in section showing the crimping elements in crimping position.

In the embodiment of the invention illustrated in FIG. 1, the shoe 18 is releasably mounted to the device by means of upper and lower mounting brackets 39, 39. Referring now to FIGS. 5 and 6, the mounting brackets are constructed to engage and complement the normally disposed and intersecting outside faces 41, 41 of the shoe 18. Regardless of the contour presented by the shoe for engaging and complementing the protective strip, the outside faces 41, 41 are always formed at a right angle so that the brackets 39, 39 are useable for mounting any of the interchangeable shoes. Thus, for example, in the embodiment of the invention illustrated in FIG. 7, despite the fact that the shoe **18*a* is constructed with central trough 37 and angularly disposed abutment surfaces 38*a*, 38*a* for complementing the contour of strip 16*a*, the outside faces 41*a*, 41*a* of the shoe are formed at a right angle for engagement with mounting brackets 39, 39**.

The mounting brackets 39, 39 are attached to the device by means of nut and bolt assemblies 43, 43; however, those skilled in the art will recognize that the brackets may be attached to the device in any suitable manner. The shoe is releasably mounted within the brackets by means of screws 45, 45 shown best in FIG. 2. To remove the shoe 18 from the brackets and mount, for example, shoe **18*a*, a workman first disengages the toggle mechanism 22 from the shoe 18 by removing bolts 49, 49 (see FIGS. 5 and 6) and then removes screws 45, 45. Shoe 18*a* is then secured in the brackets with screws 45, 45, and the toggle mechanism 22 is re-mounted on the shoe 18*a* with bolts 49, 49. Thus, in those situations where a workman must attach protective strips to corners of differing contour, he can quickly and easily adapt the device 10** to attach a protective strip shaped to complement each particular corner.

Those skilled in the art will recognize that the mounting brackets 39, 39 can be integrally formed with the shoe thus eliminating the need to releasably mount the shoe within the brackets. If the device is constructed in this manner, the shoe is removed from the actuator 24 by first disengaging the toggle mechanism 22 from the shoe as discussed above and then removing nut and bolt assemblies 43, 43.

Referring now to FIGS. 5 and 6, the device 10 further includes a pair of chisel-shaped crimping elements 20, 20 pivotally supported on shoe 18. The crimping elements are moveable between an inactive position shown in FIG. 5 and a crimping position illustrated in FIG. 6. In the inactive position, the edges 40, 40 of the crimping elements do not project beyond the abutment surfaces 38, 38. When the crimping elements are driven into crimping position, the edges 40, 40 project beyond the abutment surfaces 38, 38 to deform the metal corner strip 16 received within shoe 18, and thereby attach the strip to the wall panels 14, 14, as will be hereinafter explained in more detail.

Still referring particularly to FIGS. 5 and 6, the illustrated crimping elements 20, 20 comprise an integral part of the toggle mechanism 22, which moves the crimping elements between their inactive and crimping positions. The toggle mechanism is releasably supported on shoe 18 and includes a pair of opposite handed linkages 42, 42. Each linkage 42 has two link members 44 and 46 which are pivotally joined to each other. The toggle mechanism 22 is connected to a reciprocating shaft 50. The movement of reciprocating shaft 50, toggle mechanism 22 and crimping elements 20, 20 will be discussed in more detail below.

Referring again to FIG. 1, the toggle mechanism 22 is operated by the powered actuator 24 which is mounted on shoe 18. The actuator 24 includes a housing 56 having a pistol grip 58 extending from it. The shaft 50 is supported within housing 56 for reciprocating movement between a forward position illustrated in FIG. 6 and a rearward position illustrated in FIG. 5. Shaft 50 is reciprocated by a solenoid 60 and return spring mechanism 61 mounted within housing 56 and shown schematically in FIG. 1. The solenoid and return spring mechanism are activated by a trigger switch 62 associated with the pistol grip 58.

When the solenoid 60 is activated by the switch 62, the shaft 50, toggle mechanism 22 and crimping elements 20, 20 move from the position illustrated in FIG. 5 to that illustrated in FIG. 6. As shaft 50 moves forward toward the shoe 18 the angle formed by the linkage members 44 and 46 become substantially more acute, causing crimping elements 20, 20 to pivot from their inactive position and plunge into corner strip 16 received within shoe 18. When solenoid 60 is deactivated, the return spring 61 associated with the solenoid moves the shaft 50 away from the shoe. The angle formed by linkage members 44 and 46 once again becomes oblique and crimping elements 20, 20 return to their inactive position. To ensure that shaft 50 is not deflected as crimping elements 20, 20 are moved from their inactive to crimping position, shaft 50 is contained within channel 63 formed in upper mounting bracket 39.

As an added safety feature, pressure switch mechanism 64 positioned within housing 56 and linked to trigger switch 62 prevents the device 10 from being actuated unless the device is pressed against a wall or other suitable surface. Pressure switch mechanism 64 is of the type commonly referred to by those skilled in the art as a "dead man" switch. The mechanism 64 includes a spring loaded probe 66 which extends beyond the housing 56 to upper mounting bracket 39 and a lock member 68 which locks the trigger switch 62 in open position. To disengage lock member 68 and release trigger switch 62, probe 66 must be in pressing engagement with upper bracket 39. This is accomplished by firmly pushing the device 10 against the wall corner during the attaching operation.

The power actuator 24 is mounted to the shoe 18 in such a way as to allow for a slight pivotal movement of the actuator when the device 10 is pressed against the corner 12. As the device 10 is pressed firmly against the corner 12 by a workman, the actuator 24 pivots around lower nut and bolt assembly 43 until upper nut and bolt assembly 43 moves from the forward end of slot 70 (the position shown in FIG. 1) to the rearward end of the slot to pressingly engage pressure switch mechanism 64 and permit trigger switch 62 to close.

To install, for example, protective metal strip 16 along the outside wall corner 12, a workman aligns the strip along the corner so that sides 30, 30 of strip 16 overlap wall panels 14, 14. Holding the device 10 in his free hand, the workman aligns device 10 with metal strip 16 so that abutment surfaces 38, 38 of shoe 18 complement and overlay sides 30, 30 of strip 16. With the metal strip 16 and the device 10 positioned on the corner 12 in this manner, the workman simply operates the trigger switch 62 to activate solenoid 60 and drive crimping elements 20, 20 into the metal strip as illustrated in FIG. 6. When solenoid 60 is deactivated, crimping elements 20, 20 return to their inactive position so that the device 10 may be removed from engagement with the strip. The indentations formed in the metal strip by the crimping elements project into wall panels 14, 14 thereby retaining the strip in assembly with the wall.

It is important to note that the power actuated device allows the workman to use both hands to align and attach the metal strip to the corner of the wall. Moreover, the danger of metal particles chipped from the attaching device is eliminated.

Figure 8:
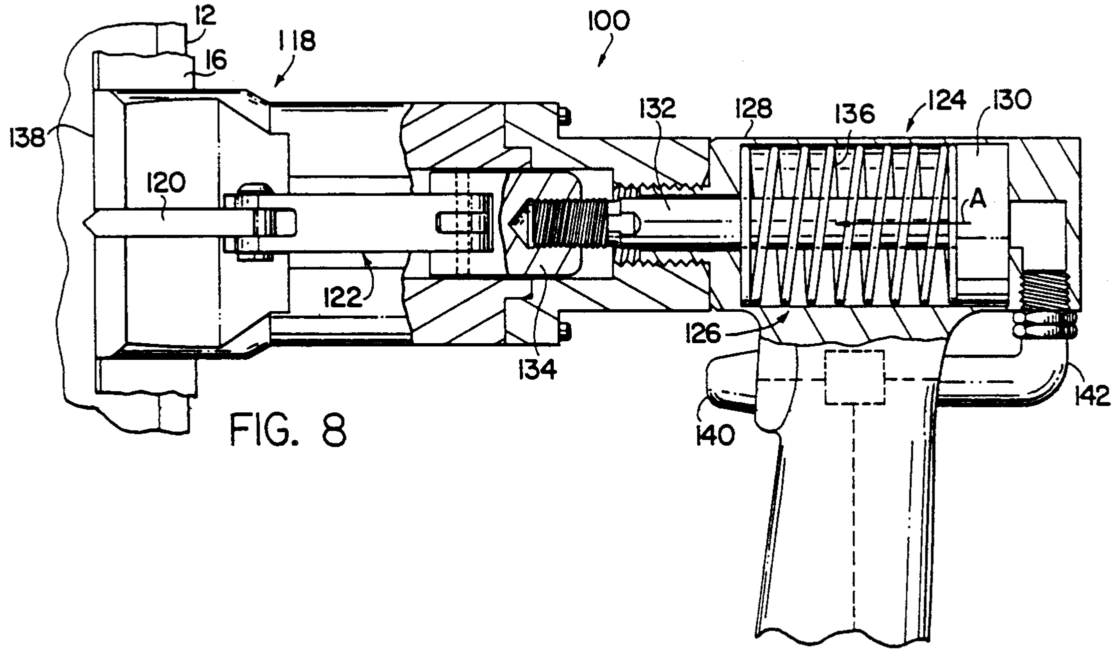
FIG. 8 is a fragmentary side elevational view of a second embodiment of the present invention.

A second embodiment of the present invention is illustrated schematically in FIG. 8. The device 100 essentially comprises an shoe, indicated generally at 118, for holding a protective strip, for example strip 16, along an associated corner such as the corner 12, a pair of crimping elements 120, 120 (only one shown) pivotally and releasably supported on the shoe 118, a toggle mechanism, indicated at 122, for moving the crimping elements into crimping engagement with the protective strip, and an air-powered actuator, indicated generally at 124, releasably coupled to the shoe 118 for operating the toggle mechanism 122.

The air-powered actuator 124 comprises a pneumatic piston and cylinder assembly, indicated generally at 126, which includes cylinder 128, piston 130 and piston rod 132. The rod is connected at its rearward end to piston 130 and is threadably connected at its forward end to toggle mechanism 122 by means of slide 134.

When not in operation, piston 130 is biased by means of spring 136 in the position shown in FIG. 8. With the piston in this position, the crimping elements 120 extend just slightly beyond the abutment surfaces 138, 138 (only one shown) of the shoe 118. When trigger switch 140 is closed, compressed air is introduced into cylinder 128 via hose 142 causing piston 130 to move in the direction indicated by arrow A. As the piston moves in the direction of arrow A crimping elements 120, 120 are moved to their crimping position by toggle mechanism 122 to attach a protective strip received within shoe 118 to a wall corner. The compressed air may be supplied from a portable compressor (not shown) carried on the workman's tool belt. Such compressors are compact battery powered units which are well known to those skilled in the art.

As noted above, the crimping elements are releasably mounted on the shoe 118 and the shoe is itself releasably coupled to the actuator 124. Thus, the shoe 118 is interchangeable with other shoes of differing shape enabling a workman to quickly and easily adapt the device 100 to attach a protective strip to wall corners of differing contour.

Figure 10:
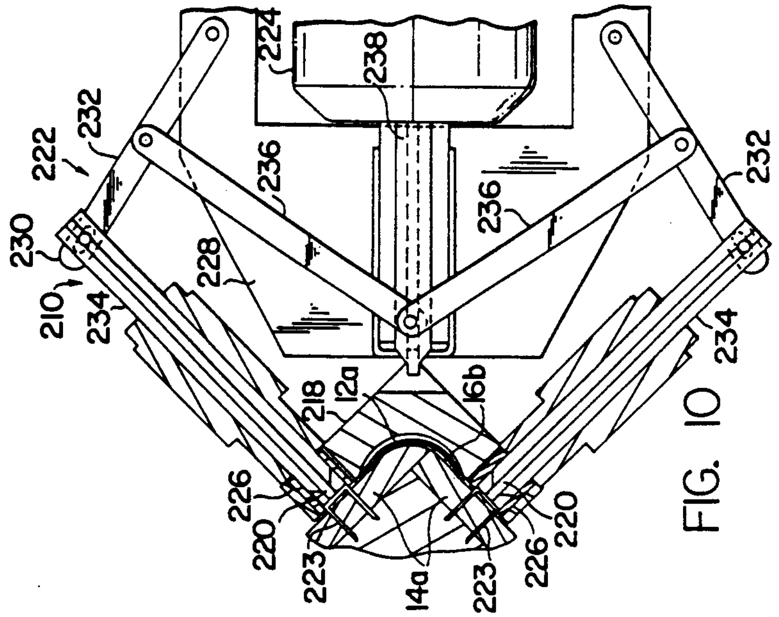
FIG. 10 is a fragmentary top plan view partially in section showing the stapling elements in stapling position.
Figure 9:
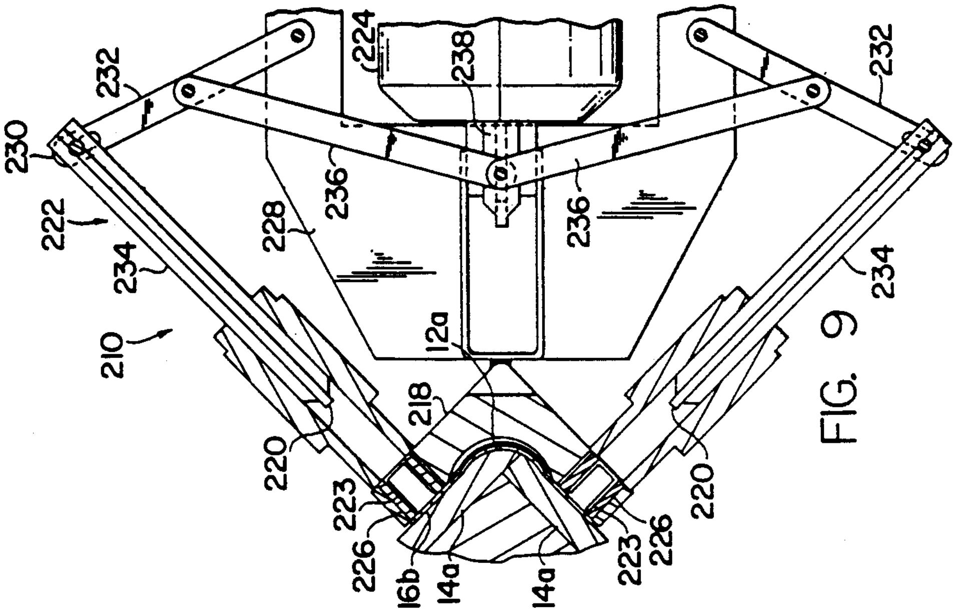
FIG. 9 is fragmentary top plan view partially in section of a second embodiment of the attaching device showing the protective strip of FIG. 11 received within the shoe and the stapling elements in inactive position.

A third embodiment of the present invention is illustrated schematically in FIGS. 9 and 10. The device 210 essentially comprises a shoe, indicated generally at 218, for holding a protective strip, for example the strip 16*a*, in place along an associated corner such as the corner 12*a*, a pair of striking elements 220, 220 releasably supported on the shoe 218, a toggle mechanism, indicated generally at 222 for moving the striking elements into striking engagement with a pair of fasteners 223, 223 and a powered actuator 224 releasably mounted on the shoe 218 for operating the toggle mechanism.

The illustrated striking elements 220, 220 comprise an integral part of the toggle mechanism 222, which moves the striking elements between the inactive position shown in FIG. 9 and the fastening position shown in FIG. 10. The toggle mechanism 222 is supported on plate 228 and releasably supported on the shoe 218. The mechanism comprises two opposite handed linkages 230, 230 each of which has two link members 232, 234 which are pivotally joined to each other. Two operating links 236, 236 connect the linkages to the reciprocated shaft 238 of the powered actuator 224.

The fasteners shown in FIGS. 9 and 10 are staples: however, the invention is not limited in this regard, and those skilled in the art will recognize that any suitable fasteners, such as nails or tacks, may be used. The staples are stored in a pair of magazines 226, 226 supported on the shoe 218 and are sequentially feed by line pressure from a storage position to a fastening position. When in the fastening position, the staples are situated such that they are struck and driven by the striking elements 220, 220 as the elements are moved by the toggle mechanism 222 from the inactive position shown in FIG. 9 to the fastening position shown in FIG. 10.

Figure 11:
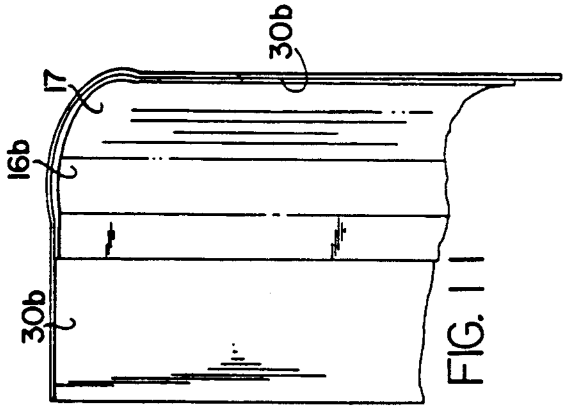
FIG. 11 is a perspective view of a third protective corner strip.

The device shown in FIGS. 9 and 10 is fitted with a shoe shaped to complement the contour of an arcuate or rounded protective strip such as the strip 16*b* shown in FIG. 11. The protective strip 16*b* has a shape which complements an arcuate or rounded outside wall corner, such as the corner 12*a* formed by the wall panels 14*a*, 14*a* shown in cross section in FIGS. 9 and 10. The strip 16*b* comprises an elongated central channel 17 having an arcuate shape in cross section. The channel 17 is customarily formed from sheet metal and is covered with a heavy weight construction paper which form two angularly disposed paper tabs 30*b*, 30*b* extending along the lateral edges of the channel 17. The paper tabs are adapted to overlie the edges of the intersecting wall panels.

As noted above, the striking elements are releasably mounted on the shoe 218 and the shoe is itself releasably mounted on the power actuator 224. Thus, the shoe 218 is interchangeable with other shoes of differing shape enabling a workman to quickly and easily adapt the device 210 to attach a protective strip to wall corners of differing contour.

Figure 12:
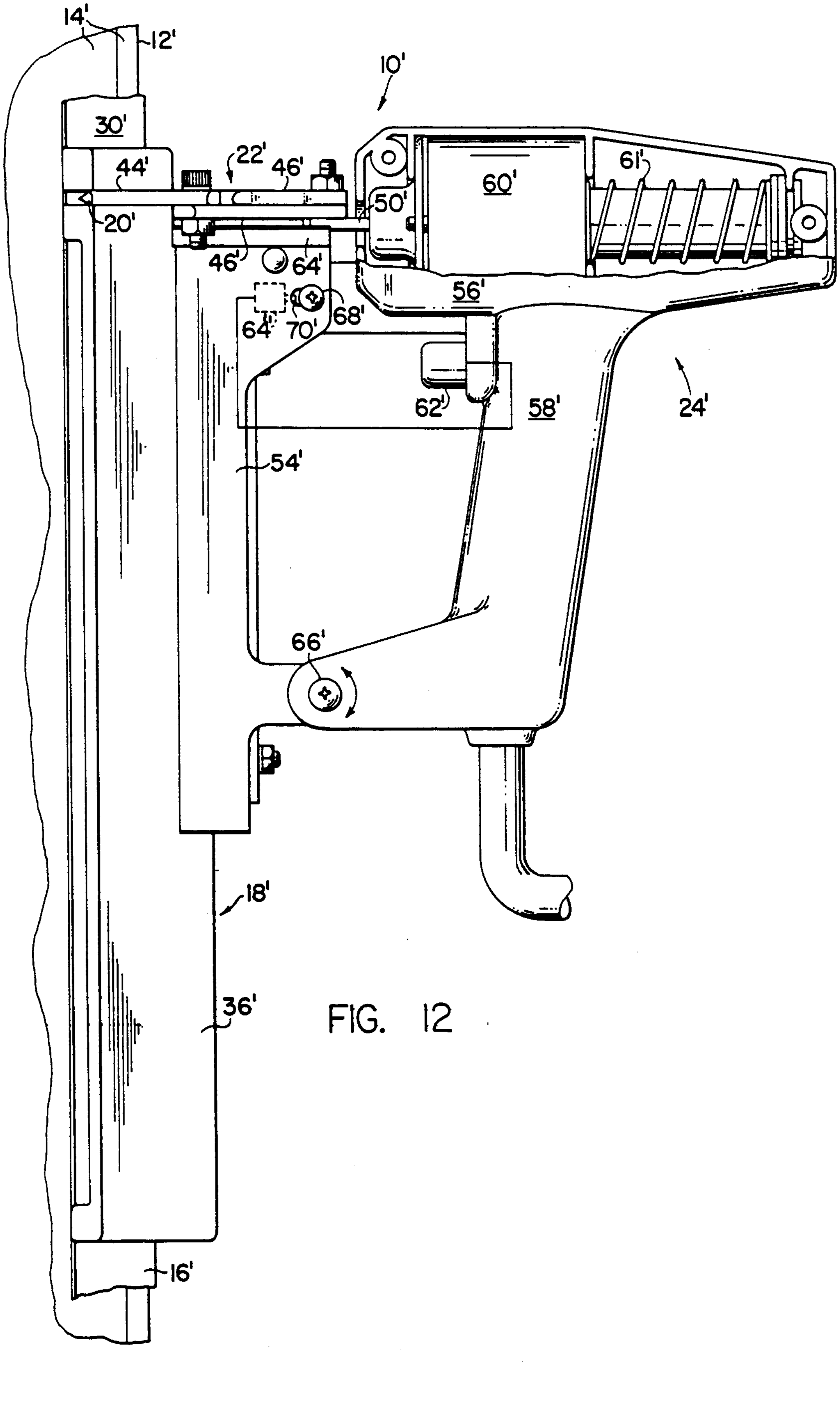
FIG. 12 is a fragmentary side elevational view of a fourth embodiment of the present invention.

FIG. 12 illustrates another power actuated device embodying the present invention, indicated generally at 10', for attaching a protective corner strip 16' along an outside wall corner 12' formed by intersecting wall panels 14', 14' (one shown). The device 10' essentially comprises an elongated shoe, indicated generally at 18', for holding the protective strip 16' in place along an associated corner such as the corner 12', a pair of crimping elements 20', 20' (one shown) pivotally supported on the shoe 18', a toggle mechanism indicated generally at 22' for moving the crimping elements into crimping engagement with the corner strip, and a powered actuator, indicated generally at 24', mounted on the shoe 18' for operating the toggle mechanism 22'.

The elongated shoe 18' is preferably made from lightweight rigid material such as aluminum or plastic and comprises an angle member 36' defining angularly disposed abutment surfaces 38', 38' (one shown). The shoe is constructed so that abutment surfaces 38', 38' engage and complement the sides 30', 30' (one shown) of strip 16' when the strip is held in place along a wall corner such as the corner 12'. The abutment surfaces 38', 38' permit the elongated shoe to maintain the strip 16' and device 10' in alignment with the corner 12' during the attaching process.

The crimping elements 20', 20' comprise an integral part of the toggle mechanism 22', which moves the crimping elements between their inactive and crimping positions. The toggle mechanism is supported on shoe 18' and includes a pair of opposite handed linkages having two link member 44' and 46' which are pivotally joined to each other. The toggle mechanism 22' is connected to a reciprocating shaft 50'.

The toggle mechanism 22' is operated by the powered actuator 24' which is attached to a frame 54' and mounted on shoe 18'. The actuator 24' includes a housing 56' having a pistol grip 58' extending from it. The shaft 50' is supported within housing 56' for reciprocating movement between a crimping position wherein the crimping elements extend beyond the abutment surfaces 38', 38' and are in crimping engagement with the corner strips and an inactive position wherein the crimping elements do not extend beyond the abutment surfaces 38', 38'. Shaft 50' is reciprocated by a solenoid 60' and return spring mechanism 61' mounted within housing 56' and shown schematically in FIG. 12. The solenoid and return spring mechanism are activated by a trigger switch 62' associated with the pistol grip 58'. To ensure that shaft 50' is not deflected as crimping elements 20', 20' are moved from their inactive to crimping position, shaft 50' is contained within slide 64'.

As an added safety feature, pressure switch mechanism 64'' positioned within frame 54' and linked to trigger switch 62' prevents the device 10' from being actuated unless the device is pressed against a wall or other suitable surface. The powered actuator 24' is mounted to frame 54' in such a way as to allow for a slight pivotal movement of the actuator when the device 10' is pressed against the corner 12'. That is, the actuator 24' pivots around nut and bolt assembly 66' until nut and bolt assembly 68' moves from the rearward end of the slot 70' (the position shown in FIG. 12) to forward end of the slot to engage pressure switch 64' and permit trigger switch 62' to close.

While the present invention has been described in one particular embodiment, modifications may be made therein by a person skilled in the art without departing from the scope of the invention as expressed in the following claims.

I claim:

1. A device for attaching a protective strip to the corner formed by the intersection of two wall panels, said protective strip provided in a plurality shapes, each of said shapes generally complementing the contour of an associated corner, said device comprising:

a plurality of interchangeable shoes for holding the protective strip and the device in alignment with the corner, each of said shoes being selected from a plurality of shoes of differing shape and having a contour substantially complementing the contour of at least an associated portion of a selected protective strip;

means for releasably mounting each of said shoes on the device;

attaching means adapted to be mounted on said device for movement between an inactive position wherein said attaching means are out of engagement with the protective strip held by the shoe and an attaching position wherein said attaching means engage and attach the protective strip to each of the wall panels;

means for releasably supporting and operably connecting said attaching means to said shoe mounted on said device so said shoe may be disconnected from said attaching means and said device and replaced depending upon the contour of a selected protective strip to be attached to said corner;

operating means for moving said attaching means from said inactive position to said attaching position;

biasing means for normally maintaining said attaching means in said inactive position; and power operated means mounted on said shoe and operably connected to said operating means for actuating said operating means to move said attaching means to said attaching position, said power operated means including a housing aligned with said operating means having a pistol grip extending transversely therefrom;

a shaft mounted within said housing extending transversely to said pistol grip for reciprocating movement connected to said operating means; and means on said pistol grip for initiating reciprocating movement of said shaft.

2. A device as set forth in claim 1 wherein said power operated means comprises a motor having a fixed part mounted in fixed position relative to said shoe and a reciprocally movable part connected to said operating means.

3. The device as set forth in claim 2 wherein said motor comprises a solenoid and said movable part comprises the armature of said solenoid.

4. The device set forth in claim 2 wherein said motor comprises a pneumatic piston and cylinder assembly and said movable part comprises the piston of said assembly.

5. The device as set forth in claim 1 wherein said attaching means comprises said operating means.

6. The device as set forth in claim 4 wherein said operating means comprises a toggle linkage and said attaching means comprises crimping elements integrally formed on the ends of links comprising said linkage, said crimping elements movable between an inactive position wherein said crimping elements are out of engagement with the protective strip held by the shoe and a crimping position wherein said crimping elements engage and crimp the protective strip into holding engagement with the wall panels.

7. The device set forth in claim 4 wherein said operating means comprises a toggle linkage and said attaching means comprises striking elements integrally formed on the ends of links comprising said linkage, said attaching means further comprising a plurality of fasteners associated with said striking elements, said striking elements movable between an inactive position wherein said striking elements are out of engagement with said fasteners and a fastening position wherein said striking elements strike and drive at least two of said plurality of fasteners through said protective strip held by said shoe and into said wall panels to fasten said protective strip into holding engagement with said wall panels.

8. The device as set forth in claim 2 wherein said motor comprises a solenoid mechanism having a reciprocally movable armature connected to said operating means and said biasing means comprises an armature return spring associated with said solenoid mechanism.

9. The device as set forth in claim 2 wherein said motor comprises a pneumatic piston and cylinder assembly having a reciprocally movable piston connected to said operating means and said biasing means comprises a piston return spring associated with said assembly.

10. The device set forth in claim 1 wherein said means for releasably mounting said shoe on said device comprises a pair of mounting brackets attached to said power operated means, each one of said pair of shoe support brackets having an associated connector for releasable mounting said shoe on said device.

11. A device for attaching a protective strip along a corner formed by the intersection of two wall panels comprising:

a plurality of interchangeable shoes adapted to be releasably mounted on the device for holding the protective strip in place along the corner, each of said shoes having angularly disposed abutment surfaces which engage and substantially complement the strip when the strip is placed along the corner;

a pair of chisel-shaped crimping elements pivotally and releasably supported on and operably connected to the shoe mounted on the device and movable between an inactive position wherein said crimping elements do not extend beyond the abutment surfaces and a crimping position wherein the crimping elements extend beyond the abutment surfaces to crimp the strip received within the shoe to attach the strip to the wall;

a toggle mechanism supported on the shoe and integrally connected to the crimping elements to move the crimping elements between their active and crimping positions;

a powered actuator mounted on the shoe for operating the toggle mechanism, said actuator comprising a housing having a pistol grip extending transversely therefrom, a shaft mounted within the housing extending transversely to said pistol grip for reciprocating movement and connected to the toggle mechanism to operate the mechanism and move the crimping elements between their inactive and crimping positions, means on said pistol grip for initiating reciprocating movement of said shaft; and at least one mounting bracket attached to said power actuator, said mounting bracket having an associated threaded connector for releasably mounting a shoe on said device.

12. A device for attaching a protective strip along a corner formed by the intersection of two wall panels comprising:

a plurality of interchangeable elongated shoes each adapted to be releasably mounted on the device for holding the protective strip in place along the corner, said shoe having angularly disposed abutment surfaces which engage and substantially complement the strip when the strip is placed along the corner;

a plurality of fasteners mounted on said shoe for movement between a storage position and a fastening position;

a toggle mechanism supported on the shoe, said toggle mechanism integrally connected to a pair of striking elements releasably mounted on and operably connected to said shoe to move the striking elements between an inactive position wherein said striking elements are out of engagement with said fasteners and a fastening position wherein said striking elements strike and drive at least two of said plurality of fasteners through said protective strip held by said shoe and into said wall panels to fasten said protective strip into holding engagement with said wall panels;

a powered actuator mounted on the shoe for operating the toggle mechanism, said actuator comprising a housing having a pistol grip extending transversely therefrom, a shaft mounted within the housing extending transversely to said pistol grip for reciprocating movement and connected to the toggle mechanism to operate the mechanism and move the striking elements between their inactive and fastening positions, means on said pistol grip for initiating reciprocating movement of said shaft; and at least one mounting bracket attached to said power actuator, said mounting bracket having an associated threaded connector for releasably mounting a shoe on said device.

13. A device for attaching a protective strip along a corner formed by the intersection of two wall panels comprising removable, interchangeable retaining means for holding the protective strip and the device in alignment with the corner, attaching means releasably supported on and operably connected to said retaining means for movement between an inactive position wherein said attaching means are out of engagement with the protective strip held by said retaining means and an attaching position wherein said attaching means engage and attach the protective strip into holding engagement with the wall panels, operating means connected to the attaching means for moving said attaching means from said inactive position to said attaching position, said operating means including means cooperating with said retaining means for maintaining said strip and said device in alignment with the corner as said attaching means are moved from their inactive position to their attaching position, biasing means for normally maintaining said attaching means in said inactive position, and power operated means mounted on said retaining means and operably connected to said operating means for actuating said operating means to move said attaching means to said attaching position, said power operated means including a housing aligned with said operating means having a pistol grip extending transversely therefrom, a shaft mounted within said housing extending transversely to said pistol grip for reciprocating movement connected to said operating means, and means on said pistol grip for initiating reciprocating movement of said shaft.

* * * * *